Nov. 21, 1950   A. H. MASSEY ET AL   2,530,889
EGG GATHERING BASKET
Filed Aug. 1, 1949                               2 Sheets-Sheet 1
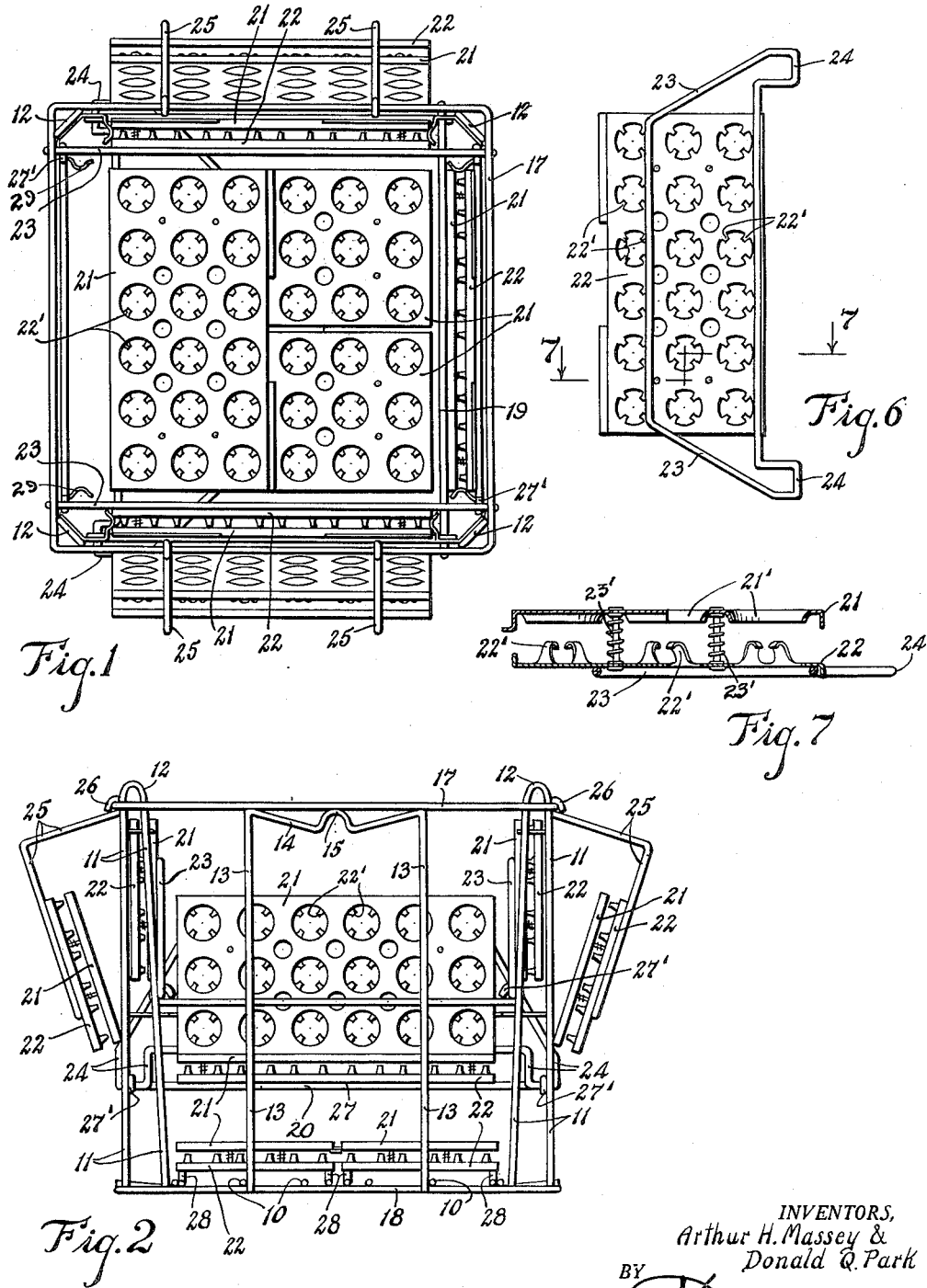
INVENTORS,
Arthur H. Massey &
Donald Q. Park
BY
ATTORNEY Nov. 21, 1950  A. H. MASSEY ET AL  2,530,889
EGG GATHERING BASKET
Filed Aug. 1, 1949  2 Sheets-Sheet 2
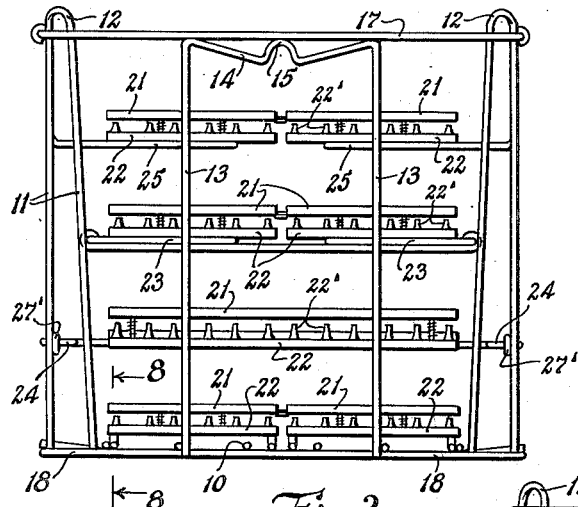
Fig.3
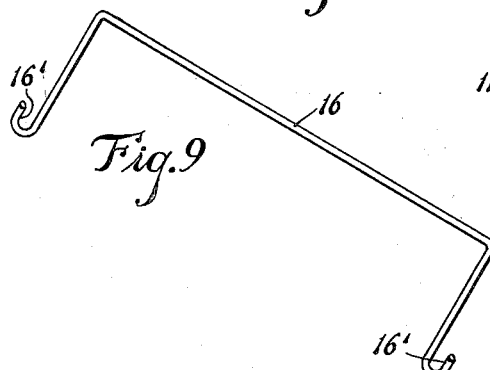
Fig.9
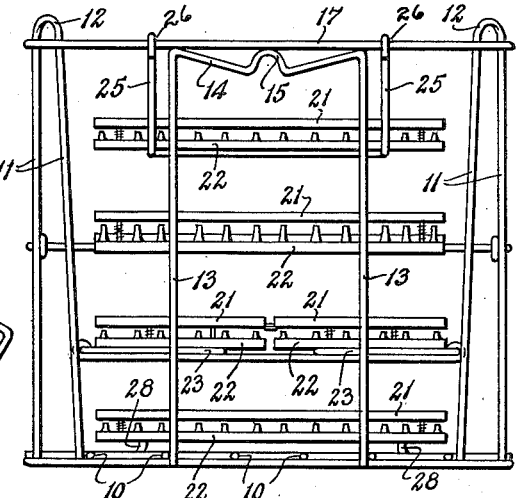
Fig.4
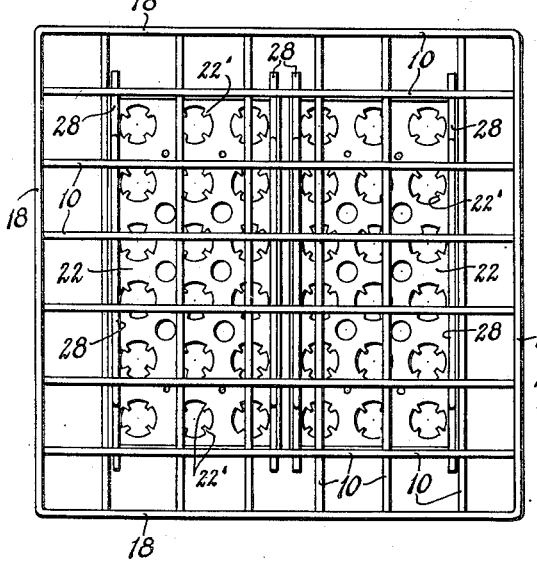
Fig.5
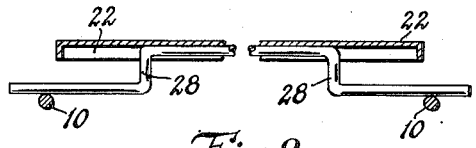
Fig.8
INVENTORS,
Arthur H. Massey &
Donald Q. Park
BY
ATTORNEY.

Patented Nov. 21, 1950

2,530,889

UNITED STATES PATENT OFFICE 2,530,889

EGG GATHERING BASKET

Arthur H. Massey, Alhambra, and Donald Q. Park, Los Angeles, Calif.

Application August 1, 1949, Serial No. 108,016

7 Claims. (Cl. 224—45)

This invention relates to egg gathering baskets, and more particularly to an egg gathering basket having a plurality of adjustable egg holders arranged one above the other at different levels, each level group being movable out of the way to give access to the next group, or level, below, whereby a number of levels or floors can be held as a unit for gathering eggs, and whereby several dozen eggs can be gathered each trip with a minimum of inconvenience.

Among the salient objects of the invention are:

To provide an egg gathering basket in which each floor or level has a plurality of egg holders which can be hingedly moved from over the floor or level below, without being disconnected from the basket, to give access to the next floor or level below;

To provide in such an egg gathering basket a plurality of egg holders each consisting of two spaced floor members, mounted one above the other and yieldingly held apart, whereby the upper floor member can be yieldingly moved toward and to the lower member, said floor members having egg receiving openings therethrough, whereby eggs can be placed therein and held in vertical position;

To provide in such an egg gathering basket a plurality of egg holders of the character referred to which can be hingedly swung over the top edges of the basket in an out-of-the-way position to give access to the next lower level, and can be replaced one by one, or level by level as said holders are filled with eggs.

In order to explain our invention, we have shown on the accompanying two sheets of drawings, one practical embodiment thereof, which we will now describe.

Figure 1 is a plan view looking down into an egg gathering basket embodying our invention, with two of the egg holders swung over the top edges of the basket, and others raised into vertical positions in the basket area;

Figure 2 is a side elevation of what is shown in Fig. 1, showing the two top egg holders swung over the opposite edges of the top, and showing some of the inner level egg holders raised up against the inside of the basket;

Figure 3 is a side elevation of the invention, showing all of the egg holders in operating positions;

Figure 4 is a side elevation of the same from another side;

Figure 5 is a bottom plan view of the egg gathering basket;

Figure 6 is a bottom plan view of an egg holder removed from the basket, showing the wire holder and hinge portions;

Figure 7 is a cross sectional view taken on the line 7—7 of Fig. 6;

Figure 8 is a sectional view of a detail at line 8—8, Fig. 3; and

Figure 9 shows a wire handle which can be used for lifting and carrying the basket.

Referring in detail to the drawings, the basket proper as shown, is made of wire with cross wires 10, 10, forming the bottom, as seen in Fig. 5 and vertical wires 11, 11, at the corners, with their tops looped together, as at 12, 12, with other vertical wires as 13, 13, connected at their tops by an angle portion, as 14, having an arched portion therein, as 15, forming a lifting means at each side of the basket, and which will receive the hooked ends 16' of a handle 16, Fig. 9, as will also the corner loops 12, at the four corners. Top and bottom border wires, as 17 and 18, with intermediate horizontal wires, as 19 and 20, are shown on the sides of the supporting frame.

It will be understood, of course, that any number of brace wires can be used for the supporting frame, as may be desired.

The egg holders are each composed of upper and lower sheet metal members, as 21 and 22, with openings therethrough, as 21' and 22' and with coiled spacing springs, as 23', 23', therebetween, and whereby the upper member 21 can be yieldingly pressed down toward the lower member 22. The upper member 21 is provided with struck-in openings 21', and the lower member 22 is provided with struck-up prongs or tongues, as 22', 22', to form supports for the lower end of an egg, extending down through the opening 21' in the upper member. This allows circulation of air around the eggs as they are placed in the holders and holds them in vertical positions.

Each of said lower egg holding members 22 has secured on its under side a wire frame, as 23, Fig. 6, bent to provide two hinge or bearing members, as 24, 24, at opposite ends, whereby said holders can be raised to vertical positions against the inside of the supporting frame, as seen in Figs. 1 and 2, one pair making one level or floor.

The two top egg holders are supported by angle wires, as 25, 25, pivotally connected around the top frame wire 17, as at 26, whereby said upper pair of egg holders can be swung out over the top opposite sides of the basket frame, as shown in Fig. 2. The next pair of egg holders are raised to vertical positions inside said supporting frame, at the same opposite sides thereof. The next lower pair of egg holders are raised to vertical positions at the other sides of said supporting frame and are seen in Fig. 2, with its hinge or bearings 24, 24, held in the wire loop, as at 27', formed at the opposite ends of a cross wire 27 on the side of the frame. The other part of said egg holder forming this level or floor is down in the horizontal position, above the lowermost pair, said lowermost pair being seen in Fig. 1, at the right of the one holder which is down, being the left one in Fig. 1, above the two bottom holders, shown in down positions. The two bottom egg holders, forming the lower level, are secured to the bottom cross wires 10, 10 by an angle wire, as 28, Fig. 8.

Thus we have provided a very convenient, practical and durable egg gathering basket with a number of levels or floors, each having two egg holders, and each egg holder being adjustable over the top edge of the supporting frame, or raised up to vertical position against the inside of said frame, and all without being detached from the main supporting frame or basket. Each egg holder has yieldingly spaced members through which the eggs are inserted endwise and said eggs are supported in vertical positions without danger of falling over. Each layer is sufficiently above the next layer that the eggs are safe from possible injury when the egg holders are folded down from vertical positions to horizontal positions to receive the eggs.

It is to be understood that when we use the term egg gathering basket, we mean to cover any egg holding and carrying container open at its top, and in which the egg holders are arranged one above the other. It is intended also that when we claim that the egg holders are hingedly connected with the body of the container, it includes the hinge connections of the top layer of holders which can be swung out over the top edges of said container, or the hinge connection which permits said holders to be raised to vertical positions against the inside of the container.

We do not, therefore, limit our invention to the details of construction and arrangement shown for descriptive purposes, except as we may be limited by the hereto appended claims.

We claim:

1. An egg gathering basket open at its top, a plurality of horizontal egg holders therein, arranged at different levels, one above the other, said holders being hingedly connected to said body, whereby to be moved to give access to the holders at the next level below, each holder consisting of upper and lower members connected at a space one above the other.

2. An egg gathering basket consisting of a body open at its top, an egg holder at the bottom of said body, egg holders at different levels above said bottom holder, each consisting of a pair of holders hingedly connected to said body at opposite sides thereof, whereby they can be raised out of their positions to give access to the holders below.

3. An egg gathering container open at its top, an egg holder in the bottom of said body, with separate openings for individual eggs, other egg holders at different levels above said bottom holder, each consisting of a pair of holders hingedly connected to opposite sides of said container, whereby to be raised out of their positions to give access to the holders below.

4. An egg gathering container open at its top, an egg holder in the bottom of said container, with separate openings for individual eggs, other egg holders at different levels above said bottom holder, hingedly connected to the container, whereby to be raised to vertical positions at the sides of said container, and a top egg holder hingedly connected to said container and adapted to be swung upwardly and over the side of said container to the outside thereof.

5. An egg gathering container having an open top, a series of egg holders hingedly supported in said container at different levels, and movable to out-of-the-way positions to give access to the egg holder next below, each of said egg holders consisting of upper and lower sheet material members yieldingly held apart and having registering holes therein to receive eggs endwise therein.

6. An egg gathering container having an open top, a series of egg holders hingedly supported in said container at different levels, and movable to vertical positions against the inside walls of said container to give access to the holders at the level next below, each of said egg holders consisting of upper and lower members yieldingly held apart and having registering holes therethrough to receive and hold eggs endwise therein, said lower members having struck-up fingers in their openings to form supports for the lower ends of the eggs placed in said holders.

7. An egg holding and carrying container having an open top, a plurality of egg holding members arranged in pairs at different levels, said pairs being hingedly connected at their opposite outer sides to said container and movable to vertical positions against the opposite sides of said container, to give access to the holders next below, each of said holders consisting of sheet material members having egg-receiving openings therein, said members having springs therebetween to hold them yieldingly apart, the openings in the lower member of said members having supporting fingers for the lower ends of eggs placed therein.

ARTHUR H. MASSEY.
DONALD Q. PARK.

REFERENCES CITED

The following references are of record in the file of this patent:

UNITED STATES PATENTS

| Number | Name | Date |
| --- | --- | --- |
| 183,827 | Tulp | Oct. 31, 1876 |
| 514,051 | West | Feb. 6, 1894 |
| 1,232,226 | Copony | July 3, 1917 |
| 1,507,133 | Loeble | Sept. 2, 1924 |
| 2,317,044 | Faulkner | Apr. 20, 1943 |